United States Patent

Stank et al.

[11] Patent Number: 5,312,946
[45] Date of Patent: May 17, 1994

[54] SILOXANE FLUID FROM METHYLCHLOROSILANE RESIDUE WASTE

[75] Inventors: Robert G. Stank, Ballston Spa; Luisito A. Tolentino, Clifton Park; Alan Ritzer, Sand Lake; Frank J. Traver, Troy, all of N.Y.

[73] Assignee: General Electric Company, Waterford, N.Y.

[21] Appl. No.: 867,938

[22] Filed: Apr. 13, 1992

[51] Int. Cl.$^5$ .............................................. C07F 7/08
[52] U.S. Cl. ................................. 556/430; 556/434; 556/401; 252/1; 252/351; 252/357
[58] Field of Search ................. 556/430, 434, 401; 252/1, 351, 357

[56] References Cited

U.S. PATENT DOCUMENTS

| | | | |
|---|---|---|---|
| 2,380,995 | 8/1945 | Rochow | 260/607 |
| 2,383,818 | 8/1945 | Rochow et al. | 260/607 |
| 2,575,141 | 11/1951 | Smith-Johannsen | 62/108.5 |
| 2,709,176 | 5/1955 | Bluestein | 260/448.2 |
| 3,336,352 | 8/1967 | Omietanski | 556/434 X |
| 3,445,389 | 5/1969 | McKellar | 556/434 X |
| 4,221,691 | 9/1980 | Danielson et al. | 260/33.65 B |
| 4,487,950 | 12/1984 | Ward, III et al. | 556/472 |
| 4,626,583 | 12/1986 | Arkles | 556/430 X |
| 5,041,591 | 8/1991 | Okawa | 556/434 |

FOREIGN PATENT DOCUMENTS

| | | |
|---|---|---|
| 0089783 | 9/1983 | European Pat. Off. |
| 0178191 | 4/1986 | European Pat. Off. |
| 1446520 | 12/1966 | France |
| 736971 | 9/1955 | United Kingdom |

Primary Examiner—Paul F. Shaver

[57] ABSTRACT

Siloxane fluids containing novel siloxane polymers prepared from mixtures of disilanes, disiloxanes and silylmethylenes, and a method for recovering fully alkylated linear and cyclic siloxanes with disilane, disiloxane and silylmethylene bonds, such as from methylchlorosilane residue cleavage bottoms, are disclosed.

19 Claims, No Drawings

SILOXANE FLUID FROM METHYLCHLOROSILANE RESIDUE WASTE

The present invention relates to a silicone fluid containing a novel siloxane polymer. More particularly, the present invention relates to a silicone fluid containing a novel siloxane polymer which comprises units derived from disilanes, disiloxanes and silylmethylenes.

BACKGROUND OF THE INVENTION

It has long been known in the art that methylchlorosilanes can be prepared by the direct reaction of particulate silicon and methyl chloride in the presence of metallic copper or silver catalyst. These reactions are disclosed in the literature, e.g. Rochow, U.S. Pat. No. 2,380,995 and Rochow, U.S. Pat. No. 2,383,818. In addition to dimethyldichlorosilane, a variety of other silanes can be formed such as tetramethylsilane, trimethylchlorosilane, methyltrichlorosilane, silicon tetrachloride, trichlorosilane, methyldichlorosilane and dimethylchlorosilane.

In addition to dimethyldichlorosilane, which is generally viewed as the most commercially attractive methylchlorosilane, a residue is produced during the formation of the methylchlorosilane crude. The residue is comprised of products in the methylchlorosilane crude having a boiling point above about 70° C. at atmospheric pressure. The residue contains such materials as disilanes, for example, symmetrical 1,1,2,2-tetrachlorodimethyldisilane, 1,1,2-trichlorotrimethyldisilane, disiloxanes, silylmethylenes and other higher boiling species, for example, trisilanes, trisiloxanes, trisilylmethylene, etc.

It is further known in the art that certain components in the residue, mostly the highly chlorinated disilanes such as 1,1,2,2-tetrachlorodimethyldisilane and 1,1,2-trichlorotrimethyldisilane, can be "cleaved" in accordance with the teachings of Bluestein, U.S. Pat. No. 2,709,176, to produce useful methylchlorosilane monomers. Cleavage of the highly chlorinated disilanes can be effected by anhydrous hydrogen chloride in the presence of a tertiary amine catalyst to form monomers. The monomers are then distilled overhead and the remaining distillate, also known as the residue of the residue, is comprised of unreacted disilanes, disiloxanes and silylmethylenes. Prior to the present invention this residue of the residue was typically considered to have little or no commercial value.

It has now been found that a substantial portion of the residue of the residue stream can be converted into a useful product by hydrolyzing the components of this stream to form a silicone fluid comprising a novel siloxane polymer. Surprisingly, these silicone fluids have now been found to be a suitable replacement for linear and branched linear methyl siloxane polymers or fluids, such as emulsions and antifoam compounds.

Further, it has now been found that the residue of the residue stream provides a source for fully alkylated linear and cyclic siloxanes with disilane, disiloxane and/or silylmethylenes bonds.

SUMMARY OF THE INVENTION

According to the present invention there is provided a silicone fluid comprising a siloxane polymer having the following general formula:

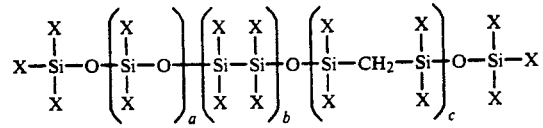

wherein X represents an alkyl group or a siloxane branch; a is an integer greater than 0; and b and c. are 0 or integers greater than 0; provided that both b and c are not 0; and wherein a, b and c can be randomly ordered in the polymer backbone. Preferably, the polymer has a viscosity of from 5 to 100,000 centistokes.

It is further contemplated that the viscosity and substituent branching of the silicone fluids of the present invention can be controlled by the addition of mono, di and tri-alkyl chlorosilane monomers. These may include trimethylchlorosilane, methyltrichlorosilane, silicon tetrachloride, trichlorosilane, methyldichlorosilane and dimethylchlorosilane.

According to the present invention there is also provided a process for the preparation of a silicone fluid comprising a siloxane polymer having the following general formula:

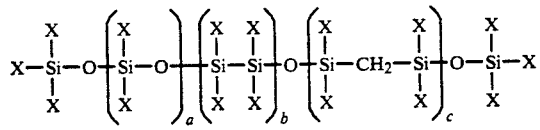

wherein X represents an alkyl group or a siloxane branch; and a is an integer greater than 0; b and c are 0 or integers greater than 0; provided that both b and c are not 0; and wherein a, b and c can be randomly ordered on the polymer backbone; said process comprising hydrolyzing a mixture of disilanes, disiloxanes and silylmethylenes.

Further, according to the present invention there is also provided a process for recovering fully alkylated linear or cyclic siloxanes with disilane, disiloxane and/or silylmethylene bonds from a residue or portion of a residue from the direct synthesis of alkylhalosilanes comprising hydrolyzing said residue to form a hydrolyzed residue; separating a volatile fraction from said hydrolyzed residue; and recovering linear or cyclic siloxanes with disilane, disiloxane and/or silylmethylene bonds from said volatile fraction.

DETAILED DESCRIPTION OF THE INVENTION

The present invention provides a silicone fluid which comprises novel siloxane polymers derived from the hydrolysis of mixtures of disilanes having the general formula

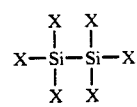

disiloxanes having the general formula

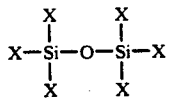

and silylmethylenes having the general formula

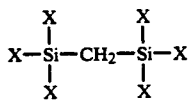

wherein X is independently a halogen atom such as chlorine or an organofunctional group, such as alkyl, vinyl, phenyl, amino or hydrogen. Preferably, X is either an alkyl group, preferably methyl, ethyl or propyl, or a chlorine atom.

The mixtures of these components are generally found in a bottom distillate, or portion thereof, of a methylchlorosilane residue cleaving process derived from a methylchlorosilane synthesis operation. These components react with water to form a siloxane bond and thereby incorporate their particular structure into the polymer backbone. The reaction is believed to proceed according to one of the two following reaction schemes, although the inventors do not wish to be bound by any particular theory:

(i) a one step process    (I)
A—Cl + B—Cl + H₂O ⟶ A—O—B + 2HCl or (ii) a two step process
A—Cl + H₂O ⟶ A—OH + HCl; B—Cl + H₂O ⟶
(hydrolysis)

B—OH + HCl

A—OH + B—OH ⟶ A—O—B + H₂O
(condensation)
in the presence of aqueous HCl wherein A and B are disilanes, disiloxanes or silylmethylenes. Overall, the reactions are similar to the well known hydrolysis of methylchlorosilane monomers. Where the term hydrolysis is used throughout the instant specification and the appended claims, the term is also meant to include alcoholysis reactions, such as with simple alcohols. These include, but are not limited to, methanol, ethanol and propanol.

In instances where the mixture of disilanes, disiloxanes and silylmethylenes is taken from the methylchlorosilane cleavage distillate bottoms or portion thereof, this mixture may also comprise, monochlorinated species, dichlorinated species and higher chlorinated species. In these instances, the monochlorinated species present form monofunctional units or chainstoppers; the dichlorinated species form difunctional units or chain extenders and the higher chlorinated species form cross-linking units. The resultant fluid is generally comprised of mainly linear and branched siloxane polymers with 15 to 30 weight percent of light ends.

These light ends generally comprise fully alkylated linear or cyclic siloxanes, disilanes, silylmethylenes and mixtures thereof, such as hexamethyl disilane, hexamethylsilylmethylene and cyclic siloxanes with disilane, disiloxane and silylmethylene bonds. These compounds in the light ends are known to be useful feedstocks for producing a wide variety of silicone compounds; and can be recovered by methods known to those skilled in the art from the silicone fluids comprising the novel siloxane polymers of the present invention.

The silicone fluids thereby obtained comprise novel siloxane polymers of the present invention have the general formula:

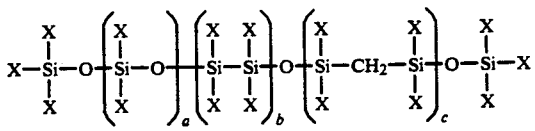

wherein X represents an alkyl group or a siloxane branch; and a is an integer greater than 0; b and c are 0 or integers greater than 0; provided both b and c are not 0; and wherein a, b and c are randomly ordered throughout the polymer backbone. In preferred embodiments, X comprises methyl, ethyl or propyl groups, most preferably methyl. The viscosity of the silicone fluid of the present invention can vary widely, such as but not limited to from 5 to 100,000 centistokes.

The polymers of the present invention can then be formulated into a variety of commercial products in which siloxanes are known to be useful. These include, but are not limited to emulsions and antifoam compounds. Additionally, other additives, such as viscosity adjusters, surfactants, colorants, antioxidants, UV stabilizers and others known to persons of skill in the art can be added for their specific properties.

DESCRIPTION OF THE PREFERRED EMBODIMENTS

The following examples illustrate the present invention. They are not to be construed to limit the scope of the claims in any manner whatsoever.

EXAMPLE 1

100 grams of methylchlorosilane residue cleavage bottoms distillate was added to 300 grams of water over a 15 minute period. During the addition, the temperature of the mixture increased from 15° C. to 54° C.

The reaction mass was allowed to cool and phase separate. The water/acid phase was decanted off and the remaining silicone oil was washed with a 5% sodium bicarbonate solution. The oil was washed a second time with water, decanted and dried with molecular sieves. The resultant product was a clear, water-white, low viscosity fluid.

EXAMPLE 2

The procedure of Example 1 was followed using 750 ml of methylchlorosilane residue cleavage bottoms distillate. A clear, water-white, low viscosity fluid was recovered.

148.8 grams of the resultant fluid was charged to a 500 ml flask. Heat and vacuum (10 mm Hg) was applied until the temperature reached 150° C. The overhead was captured, condensed and was measured to be 28.0 weight percent of the charge. The viscosity of the initial charge, overhead and stripped fluid was measured to be 9.7, 1.4, and 33.8 centistokes, respectively.

EXAMPLES 3-6

The procedure of Example 2 was followed with additional samples of methylchlorosilane residue cleavage bottoms distillate. The results of the overhead portions are set forth below in Table 1.

TABLE 1

| Example | 3 | 4 | 5 | 6 |
|---|---|---|---|---|
| Weight percent overhead | 16.3 | 24.2 | 24.0 | 29.1 |
| Stripped polymer viscosity in centistokes | 82.8 | 45.1 | 60.8 | 37.8 |

Further, it was found that the flash point of the stripped polymer product of Example 5 was 230° C. by the closed cup method (Penske-Martin).

A gas chromatography/mass spectrometry analysis was performed on the polymer of Example 5 and its degradation products with triflic acid to confirm that the product is a polymer in accordance with the appended claims.

A gas chromatography/mass spectrometry analysis was also performed on the overhead of Example 5 to confirm that the volatile fraction contained fully alkylated linear and cyclic siloxanes with disilane, disiloxane and silylmethylene bonds.

EXAMPLE 7

The siloxane fluid of Example 3 was used to prepare an emulsion according to general emulsification procedures.

417 grams of the siloxane fluid of Example 3 was heated to 43° C. To the heated fluid was added a surfactant blend comprising 13.3 grams of Triton® X-45 (alkyl phenol ethoxylate); 20.0 grams of Igepal® CO 850 (alkyl phenol ethoxylate); 1.3 grams of Kathon® II, biocide) and 48.0 grams of water. The mixture was then milled into 334.4 grams of water (7.5 mil gap at 20 psig pressure) and formed a dispersed paste. The product exhibited emulsion stability when stressed under centrifugation.

The paste had the following properties:

| % Solids | 47.2% |
|---|---|
| Viscosity | 97 cps |
| Mean Micelle Size | 448 nm |

EXAMPLE 8

690 grams of water were charged to a 5 liter 3 neck flask equipped with an overhead stirrer, condenser and a thermometer. Using an addition funnel, a blend of 354 grams of methylchlorosilane residue cleavage bottoms distillate and 39 grams of methyltrichlorosilane was added gradually under agitation. After the addition was completed, the mixture was stirred for an additional 10 minutes and heated to 90° C. for 1 hour. The mixture was cooled and transferred to a separatory funnel to phase separate. The organic phase was washed with hot water and 5% NaHCO3. It was then dried over anhydrous MgSO4 and vacuum stripped at 150° C./10 mm Hg. 205 grams of 135 centistokes oil in accordance with the appended claims was obtained.

The above-mentioned patents are hereby incorporated by reference.

Many variations of the present invention will suggest themselves to those skilled in the art in light of the above-detailed description. All such obvious modifications are within the full intended scope of the appended claims.

We claim:

1. A silicone fluid comprising a siloxane polymer having the following general formula:

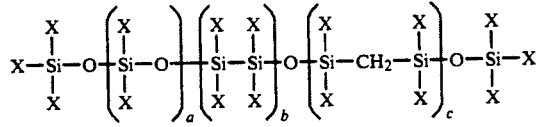

wherein X represents an alkyl group or a siloxane branch; a is an integer greater than 0; b and c are 0 or integers greater than 0; provided that b and c are both not 0; and wherein a, b and c are randomly ordered on the polymer backbone and a viscosity adjuster selected from the group consisting of monomeric organofunctional silanes.

2. A silicone fluid as defined in claim 1 wherein said siloxane polymer comprises a linear polymer or a branched polymer.

3. A silicone fluid as defined in claim 1 wherein said siloxane polymer has a viscosity ranging from about 5 to about 100,000 centistokes.

4. A silicone fluid as defined in claim 1 wherein X comprises an alkyl group.

5. A silicone fluid as defined in claim 4 wherein X comprises methyl, ethyl or propyl groups.

6. A silicone fluid as defined in claim 5 wherein X comprises methyl groups.

7. A silicone fluid as defined in claim 1 wherein said viscosity adjuster is selected from the group consisting of methyltrichlorosilane, dimethyldichlorosilane, trimethylchlorosilane, silicon tetrachloride and mixtures of any of the foregoing.

8. A silicone fluid as defined in claim 1 comprising from about 70 to about 85 weight percent of said siloxane polymers.

9. A process for the preparation of a silicone fluid comprising a siloxane polymer having the following general formula:

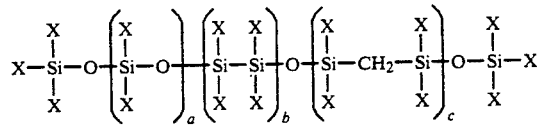

wherein X represents an alkyl group or a siloxane branch; a is an integer greater than 0; b and c are 0 or integers greater than 0; provided both b and c are not 0; and wherein a, b and c are randomly ordered on the polymer backbone; said process comprising (i) hydrolyzing a mixture of disilanes, disiloxanes and silylmethylenes derived from a methylchlorosilane synthesis operation, (ii) stripping the silicone fluid to obtain a stripped fluid, (iii) adding to the stripped fluid a viscosity adjuster and (iv) recovering the volatile fluid.

10. A process as defined in claim 9 wherein said mixture of disilanes, disiloxanes and silylmethylenes is derived from the bottom residue, or portion of a bottom residue, of a methylchlorosilane cleavage operation.

11. A process as defined in claim 9 wherein said viscosity adjuster is selected from the groups consisting of methyltrichlorosilane, dimethyldichlorosilane, trimethylchlorosilane and silicon tetrachloride.

12. A process as defined in claim 11 wherein said volatile fraction comprises fully alkylated linear or cyclic siloxanes with disilane, disiloxane or silylmethylene bonds and mixtures of any of the foregoing.

13. A process as defined in claim 12 wherein said volatile fraction comprises hexamethyldisilane, hexamethyldisiloxane, hexamethylsilylmethylene, cyclic siloxanes with disilane, siloxane and silylmethylene bonds, and mixtures of any of the foregoing.

14. A process as defined in claim 13 which further comprises recovering hexamethyldisilane and hexamethyldisiloxane from said volatile fraction.

15. An emulsion comprising the silicone fluid as defined in claim 1.

16. A process for recovering fully alkylated linear or cyclic siloxanes with disilane, disiloxane or silylmethylene bonds from a residue or portion of a residue from the direct synthesis of alkylhalosilanes comprising hydrolyzing said residue; separating a volatile fraction from said hydrolyzed residue; and recovering linear or cyclic siloxanes with disilane, disiloxane or silylmethylene bonds from said volatile fraction.

17. A process as defined in claim 16 wherein said residue is derived from the bottoms distillate of a methylchlorosilane cleavage operation.

18. A process as defined in claim 16 wherein said recovered linear or cyclic siloxanes, disilanes or silylmethylenes are selected from the group consisting of hexamethyldisilane, hexamethyldisiloxane, hexamethylsilylmethylene and cyclic siloxanes with disilane, siloxane and silylmethylene bonds.

19. A process as defined in claim 18 further comprising recovering hexamethyldisilane, hexamethyldisiloxane and mixtures thereof from said recovered linear or cyclic siloxanes with disilane, disiloxane or silylmethylene bonds.

* * * * *